UNITED STATES PATENT OFFICE.

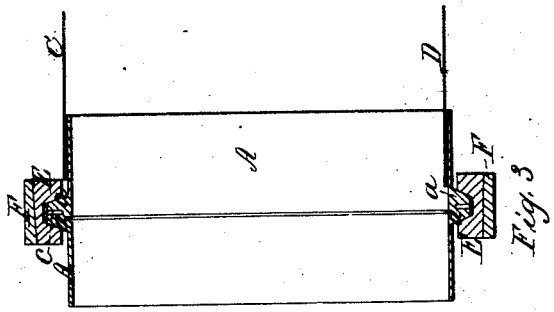
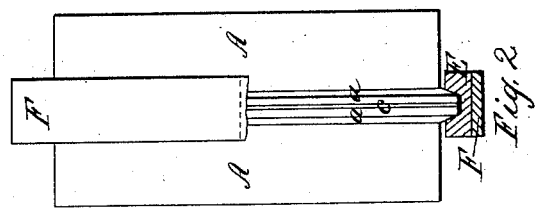
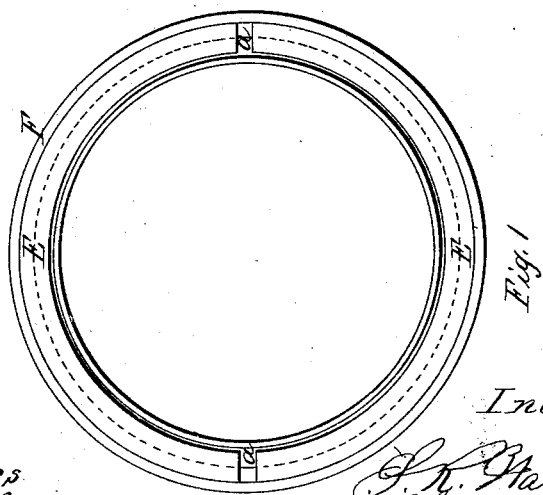

SHERMAN R. WARNER, OF NEW HAVEN, CONNECTICUT.

IMPROVEMENT IN PIPE-COUPLINGS.

Specification forming part of Letters Patent No. 37,929, dated March 10, 1863.

*To all whom it may concern:*

Be it known that I, SHERMAN R. WARNER, of the city and county of New Haven, and State of Connecticut, have invented a new and useful Improvement in Pipe-Couplings; and I hereby declare the following to be a full, clear, and exact description of the same, reference being had to the accompanying drawings, making a part of this specification, in which—

Figure 1 is an end view. Fig. 2 is a side view, a portion broken away to illustrate my improvement. Fig. 3 is a longitudinal central section.

Same letters and characters refer to like parts.

My invention is particularly designed to couple tin or similar metal pipes, for the purpose of conducting steam for heating purposes, but is equally applicable for coupling other kinds of pipe, and for other purposes. The usual method of coupling such pipes is to braze or solder the pipe to a flange, and bolt two of the flanges together in similar manner to cast-iron pipes, but in many positions where it is required to run steam-pipe for heating purposes it is very difficult, and sometimes impossible, to turn the bolts to hold the flanges. It is this and other objections that have sugcested this improvement, and its object is to overcome them.

To enable others skilled to make and use my invention, I will proceed to describe its construction and operation.

A A are two rings, to each of which is soldered or fixed the tin or other pipes which it is desired to couple. This may be done by inserting the ring within the pipe, as C, Fig. 3, or by inserting the pipe within the ring, as D, Fig. 3. On one edge of each ring I form a flange, *a*, so as to leave a space, *c*, for packing. The flanges of the two rings A A, when joined, form a wedge-shaped band around the rings.

E E are two semicircular clamps, and have each a groove on their inside to correspond with the wedge shape of the band formed, as before described, by the union of the two flanges *a a*. After the two rings have been placed together to unite the ends of two pipes, as before described, I place the clamps E E over the wedged-shaped band, and force them down onto the band. This forces the two rings A A tight and firmly together or onto the packing *c*. I usually make the rings of soft metal, as brass, and the clamps of iron or hard metal, and I find that in forcing one upon the other the iron and brass unite sufficiently to require no other fastening; but to provide against objections to this method I make the outer surface of the clamp a little inclined, (see Fig. 3,) or of less diameter at one edge than the other. I then force over the clamps a ring, F, the inside of which corresponds with the inclination of the clamps. This forces the clamps onto the flange, and holds them there until the ring is removed.

I have described my invention as having two clamps, but do not confine myself to that number, as one may be constructed to obtain the same result, or more may be used if required.

Having thus fully described my invention, what I claim therein as new and useful, and desire to secure by Letters Patent, is—

The combination and arrangement described of the rings A A, clamps E, and forcing-ring F, in the manner and for the purpose substantially as herein specified.

S. R. WARNER.

Witnesses:
A. R. TREADWAY,
JOHN E. EARLE.